United States Patent
Schaub et al.

(10) Patent No.: US 11,359,725 B2
(45) Date of Patent: Jun. 14, 2022

(54) RADIAL SHAFT SEAL

(71) Applicant: VR Automotive Dichtungssysteme GmbH, Auengrund/OT Crock (DE)

(72) Inventors: Martin Schaub, Hildburghausen (DE); Bernd Hoehn, Hildburghausen (DE)

(73) Assignee: VR Automotive Dichtungssysteme GmbH, Auengrund/OT Crock (DE)

( * ) Notice: Subject to any disclaimer, the term of this patent is extended or adjusted under 35 U.S.C. 154(b) by 77 days.

(21) Appl. No.: 16/761,566

(22) PCT Filed: Aug. 15, 2019

(86) PCT No.: PCT/DE2019/000223
§ 371 (c)(1),
(2) Date: May 5, 2020

(87) PCT Pub. No.: WO2020/043226
PCT Pub. Date: Mar. 5, 2020

(65) Prior Publication Data
US 2020/0271227 A1    Aug. 27, 2020

(30) Foreign Application Priority Data

Sep. 1, 2018 (DE) ...................... 10 2018 006 945.2

(51) Int. Cl.
*F16J 15/3232* (2016.01)
*F16J 15/3252* (2016.01)
*F16J 15/3276* (2016.01)

(52) U.S. Cl.
CPC ....... *F16J 15/3232* (2013.01); *F16J 15/3252* (2013.01); *F16J 15/3276* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS

| 4,623,153 A | 11/1986 | Nagasawa |
| 6,764,080 B2 * | 7/2004 | Hosokawa ........... F16J 15/3232 277/564 |

(Continued)

FOREIGN PATENT DOCUMENTS

| DE | 36 02 500 A1 | 10/1986 |
| EP | 1004801 A2 | 5/2000 |

(Continued)

OTHER PUBLICATIONS

International Search Report of PCT/DE2019/000223, dated Nov. 26, 2019.

*Primary Examiner* — Nathan Cumar
(74) *Attorney, Agent, or Firm* — Collard & Roe, P.C.

(57) ABSTRACT

A radial shaft seal seals a rotating shaft guided out of a liquid-loaded interior chamber, has a seal housing, an annular sealing body therein bearing against and sealing the shaft using a sealing lip, and an annular, metallic supporting body positioning the sealing body/bodies to seal interior from exterior. The supporting body presses the sealing body against the housing rear wall and is press fit and weldable there. A positioning cylinder with an outer shell is on the supporting body. An elastomer sealing body positioning cap with an elastomer sealing body is press fit on the outer shell so that the sealing body bears against a supporting body supporting web press-on collar and has a self-supporting supporting arch web, at the pressure space-side end of which is the sealing lip. A cord spring is centrally above the arch web on the sealing body outer circumference in an outer groove.

8 Claims, 8 Drawing Sheets

(58) Field of Classification Search
CPC .. F16J 15/3208; F16J 15/3212; F16J 15/3216; F16J 15/322; F16J 15/3232; F16J 15/3248; F16J 15/3252; F16J 15/3256; F16J 15/3268; F16J 15/3272; F16J 15/3276
USPC .......................................................... 277/549
See application file for complete search history.

(56) References Cited

U.S. PATENT DOCUMENTS

| | | | |
|---|---|---|---|
| 9,239,116 B2* | 1/2016 | Kreutzer | .............. F16J 15/3232 |
| 9,695,935 B2* | 7/2017 | Oiyama | ................. F16J 15/002 |

FOREIGN PATENT DOCUMENTS

| | | |
|---|---|---|
| EP | 2 817 539 B1 | 4/2016 |
| JP | H10-318377 A | 4/1998 |
| JP | 2009068643 A | 4/2009 |

* cited by examiner

Prior Art

Fig. 12

RADIAL SHAFT SEAL

CROSS REFERENCE TO RELATED APPLICATIONS

This application is the National Stage of PCT/DE2019/000223 filed on Aug. 15, 2019, which claims priority under 35 U.S.C. § 119 of German Application No. 10 2018 006 945.2, filed on Sep. 1, 2018, the disclosure of which is incorporated by reference. The international application under PCT article 21(2) was not published in English.

The invention relates to a radial shaft seal for sealing of a rotating shaft led out of a chamber pressurized with a fluid medium, which seal has a seal housing, at least one annular sealing member disposed in the seal housing and bearing tightly on the shaft by means of a sealing lip, and at least one annular metallic bracing member, which positions the sealing member/members in the seal housing, for sealing, relative to an outer space, preferably the atmosphere, of an inner chamber filled with liquid.

Service areas of such shaft seals are the mechanical, apparatus and automotive engineering industries, such as, for example, the sealing of the drive shafts of coolant pumps against low-viscosity, water-based cooling media containing lightly lubricating additives.

DE 36 02 500 A1 discloses a radial oil seal, which is inserted between a housing bore and a rotary shaft in order to seal, at that location, a fluid present in a housing. The seal consists of a first O-ring having a rubber sealing lip, which is clamped against the shaft by means of a cord spring disposed on the O-ring radially above the rubber sealing lip and bears directly in sealing manner on the rotary shaft, and of a second O-ring, which has a synthetic-resin sealing lip and is disposed on the air side of the first O-ring and adjacent to it. The synthetic-resin sealing lip extends along the rear side of the rubber sealing lip and is also in sealing contact with the rotary shaft. A flexurally stiff reinforcing ring is disposed on the air side of the second O-ring and adjacent to it. This reinforcing ring is curved along a bent portion of the synthetic-resin sealing lip, in order to brace the rear side of this bent portion. In addition, an outer ring, which firmly fixes the radially outer portions of the first and of the second O-ring as well as of the reinforcing ring, is disposed in the housing bore.

From EP 2817539 B1, a further such radial shaft seal is known that has the features mentioned in the introduction. This design is a proven-in-practice solution of the Applicant having two annular sealing members, one of a plastic and the other of an elastomer, which are disposed in a separate seal housing made of stainless-steel sheet and are spaced apart from one another by a metallic annular lathe-turned part, a bracing member, disposed firmly in the seal housing by means of a press fit. These annular sealing members are equipped with sealing lips, which bear sealingly on a running sleeve pushed onto the shaft by means of interference fit.

It is characteristic for this design that both of the sealing lips always form a large-surface sealing cylinder curved toward the pressure side in their region bearing on the shaft or on the running sleeve respectively, at least the sealing member of the elastomer has, disposed on the outer circumference of the sealing cylinder, an external groove, in which a cord spring is disposed that presses the sealing cylinder together with the associated sealing lip against the running sleeve, which is disposed on the shaft to rotate with it, in order on the one hand to minimize the leakage losses while the shaft is rotating and on the other hand to prevent leaks while stationary.

However, this results in power losses, which are to be attributed to the friction losses at the sealing cylinders of the respective sealing lips pressed by means of the cord spring(s) with full-surface contact against the running sleeve.

According to EP 2817539 B1, the annular sealing member disposed on the pressure side (water side) consists of an elastomer and the sealing member disposed on the air side consists of a plastic, preferably of polytetrafluoroethylene (PTFE).

The bracing members used for positional securing of the two sealing members in the seal housing are annular, metallic lathe-turned parts, the fabrication of which necessarily requires a relatively high fabrication expenditure.

Concerning the arrangement of the air-side sealing member, EP 2817539 B1 proposes an axial press fit, from outside, of the sealing member of plastic, such as polytetrafluoroethylene (PTFE), between the seal housing and the bracing member, with axial securing of the bracing member by mechanical notches.

For assembly of the solution previously described in EP 2817539 B1, in order to ensure a reliable radial positional securing of the plastic sealing member of polytetrafluoroethylene (PTFE) disposed on the air side against its "co-rotation" with the shaft, very high assembly forces, which in production lead to damage of the elastomeric sealing member and thus to rejects, must be applied via the elastomeric sealing member during assembly of the bracing member that clamps the plastic sealing member in the seal housing. However, in order to prevent the "co-rotation" of the plastic sealing member with the shaft absolutely during fabrication of the seals according to EP 2817539 B1, a certain "rejects percentage" is tacitly tolerated during the manufacture of this design.

The partial co-rotation of the sealing member of polytetrafluoroethylene (PTFE) that develops after prolonged service time leads to a continuous destruction of this sealing member and then has leaks resulting from this as a consequence.

However, a further disadvantage of the foregoing solution also consists in that, especially during use of novel cooling liquids (weakly lubricating media), the liquid film between the shaft/sleeve and the sealing cylinder tears away, starting from speeds of revolution of over 7,000 rpm, at the elastomeric sealing member disposed on the water side, and so, as has been reliably demonstrated in series of tests on test benches, a very significant temperature rise at the respective seal already occurs starting from approximately 7,500 rpm, with the consequence of a thermal damage of the coolant, accompanied by formation, on the shaft surface (e.g. silicates from the thermally damaged coolant), of a deposit resulting from this and leaks resulting from this.

Radial shaft seals having two different sealing members, i.e. one of an elastomer and a second one of a plastic, have also been previously described in JP 10318377 A and JP 2009068643 A. In the solution according to JP 10318377 A, the sealing face of the elastomeric sealing member disposed on the pressure side/water side, just as in the designs described in the introduction, is also clamped by means of a cord spring disposed in the region above the sealing face, in this case directly against the shaft.

Thus this solution also necessarily exhibits the disadvantages already explained in connection with the use of the cord springs in the solutions described in the introduction, such as an increased friction, which results in the region of the elastomeric sealing face from the circumferential force of the cord spring on the outer circumference of the elastomeric sealing face and which then necessarily has as a consequence temperature rises accompanying the friction losses and also the power losses associated with them.

A substantial, common feature of the two last-mentioned solutions is that the respective elastomeric sealing members are always vulcanized onto annular flanged washers. For both designs, this requires an additional vulcanization process, whereby not only is a significantly increased fabrication expenditure also necessarily associated with their manufacture, but so also is a significantly increased expenditure for recycling.

In both solutions, the prestressing of the elastomer applied by vulcanization is used in order to clamp the second seal of a plastic, for example a PTFE seal, disposed on the air side, in the respective annular flanged washer.

According to JP 10318377 A, for final assembly of the respective seal, the second seal is inserted into the annular flanged washer with the sealing member applied by vulcanization between the air-side flange of the annular flanged washer, i.e. the rear wall and the elastomeric sealing member and, in the region of the outer circumference of the elastomeric member, is clamped against the elastomeric member by means of a bracing ring.

In the solution according to JP 10318377 A, the sealing cylinders of both seals additionally run directly on the shaft and solely thereby are subjected to an increased wear.

In addition, compared with the solution according to JP 10318377 A, the solution according to JP 2009068643 A has a much narrower annular flange.

In this solution, therefore, a further annular washer, i.e. a second one, is absolutely necessary between the annular flange and the air-side plastic seal, in order to clamp the air-side plastic seal securely in the annular flanged washer against the elastomer vulcanized onto the annular flanged washer.

Since every elastomer has a so-called compression set, this causes the prestressing of the elastomeric seal to become smaller over the running time/service time of the seal.

This loss of prestressing is very highly temperature-dependent and thus proceeds more rapidly the higher the temperature is at which the seal is being used.

From this, it necessarily results that, during use of these seals in water pumps for motor vehicles, the prestressing of the elastomer is no longer sufficient with increasing service time—because of the temperatures of −40° C. to +135° C. prevailing there—to prevent the "co-rotation", already explained in connection with EP 2817539 B1, of the air-side seal of plastic with the shaft in the annular flanged washer.

The seals used in JP 2009068643 A are exclusively pure lip seals, on the sealing members of which no cord springs are disposed.

In the solution according to U.S. Pat. No. 9,695,935 B2 also, just as already disclosed in the solution according to JP 2009068643 A, two annular sealing members are used, the sealing lips of which are not loaded by cord springs but which bear not directly on the shaft, as in the solution according to JP 2009068643 A, but instead on a running sleeve, and while doing so always form a large-surface sealing cylinder curved toward the pressure side in the contacting region.

In the solution according to U.S. Pat. No. 9,695,935 B2 also, a narrow annular flange is likewise again disposed in a seal housing, as a rear wall on the air side. Two bracing rings, one on the air side and one on the water side, are again connected with this annular flange so as to rotate with it.

Between these, the sealing member of plastic disposed on the air side and equipped with a sealing lip is now clamped in such a way that the second elastomeric sealing member, disposed on the water side, is pressed in separately between the water-side bracing ring and the seal housing and then, by means of a further component, an adapter, disposed between the elastomeric sealing member and the seal housing, is secured in its position in elastically braced manner.

A very substantial disadvantage of this solution now consists in the just-explained elastic positional securing of the adapter.

The already explained relaxation of the prestressing of each elastomeric seal over the running time/service time in water pumps of motor vehicles leads with increasing service time to the situation that, as a consequence of the relaxation of the prestressing of the elastomer, the adapter then drops out of its elastic clamping in this design and thereby the seal (which then "falls apart" on the shaft sleeve) loses its sealing effect.

The solution according to JP 2009068643 A and also the solution according to U.S. Pat. No. 9,695,935 B2 always have, disposed on the water side/pressure side, an elastomeric sealing member with an elastomeric sealing lip and, disposed adjacent to this on the air side, a plastic sealing member with a plastic sealing lip. Between the two lips, a small quantity of commercial lubricating grease is applied, which serves for short-term lubrication of the elastomeric lip.

In these solutions also, in which the elastomeric sealing lip bears with large-surface contact on the shaft or on the running sleeve, an increased wear again occurs in conjunction with the new cooling liquids (weakly lubricating media), as already explained in connection with the solutions analyzed in the introduction, even after a short service time at higher speeds of revolution, i.e. at speeds of revolution of over 7,000 rpm, which wear is to be attributed to conditions ranging from mixed friction up to a dry friction wear and which leads to a damage due to "burning" of the lip seals and to a thermal damage of the coolant, together with the leaks resulting from it.

Beyond this, the pure elastomeric lip seals (i.e. those without a cord spring on the water-side sealing lip) also have the disadvantage, whether they be according to the solution of JP 2009068643 A or according to the solution of U.S. Pat. No. 9,695,935 B2, that each elastomer has a compression set, which leads to the situation that the prestressing becomes less in dependence on the level of the service temperature and of the running time, whereby the prestressing of the sealing lip relative to the shaft or to the running sleeve is significantly reduced at the working temperature of the coolant and with increasing running time.

Thereby a natural vibration phenomenon and a squeaking of the seal associated with this are induced in part at the water-side sealing lip and, when system pressure is lacking, i.e. when the motor is stationary, leaks occur and costs due to complaints result from them as a consequence of this.

However, the circumstance of leakage in the stationary status also leads to a significant reduction of the vacuum stability.

This vacuum stability is indeed always assured in new vehicles, and it makes it possible for the first filling of the cooling systems to be carried out in such a way that the cooling system can be evacuated by means of a suction pump, tested for leak tightness and then filled air-free with coolant by use of the generated vacuum.

Obviously the described wear phenomena at the sealing lips have no effects on the first filling.

However, since many workshops also fill air-free with vacuum during repair or maintenance jobs, the wear phenomena with leaks while stationary explained above lead to the situation that, in dependence on the running time and the respective service conditions, more or less air, with the disadvantages resulting from it, enters the cooling circuit, for example via leaky worn sealing lips.

The task of the invention consists in developing, for sealing, relative to the atmosphere, of a rotating shaft led out of a chamber filled with a fluid medium, a novel radial shaft seal, which is intended to eliminate the aforesaid disadvantages of the prior art even in coolant pumps, with use of low-viscosity, water-based coolants containing lightly lubricating additives, and in the process is intended simultaneously to significantly reduce the friction losses and also the leakage losses compared with the existing prior art, which is intended to increase the reliability and also the useful life significantly and in addition is intended to prevent leaks while stationary reliably, so that an "air-free" vacuum filling of coolant pumps should still be possible even after prolonged service time, and simultaneously the new type of radial shaft seal should be additionally very easy to manufacture and assemble by fabrication technology and thereby to reduce the fabrication and assembly costs significantly in final fabrication.

According to the invention, this task is accomplished by a radial shaft seal according to the features of the main claim of the invention.

Advantageous constructions, details and features of the invention will become apparent from the dependent claims as well as from the following description of the solution according to the invention on the basis of an exemplary embodiment, in conjunction with drawings, which show the use of the solution according to the invention in several designs of the seal housing.

Figure 1:
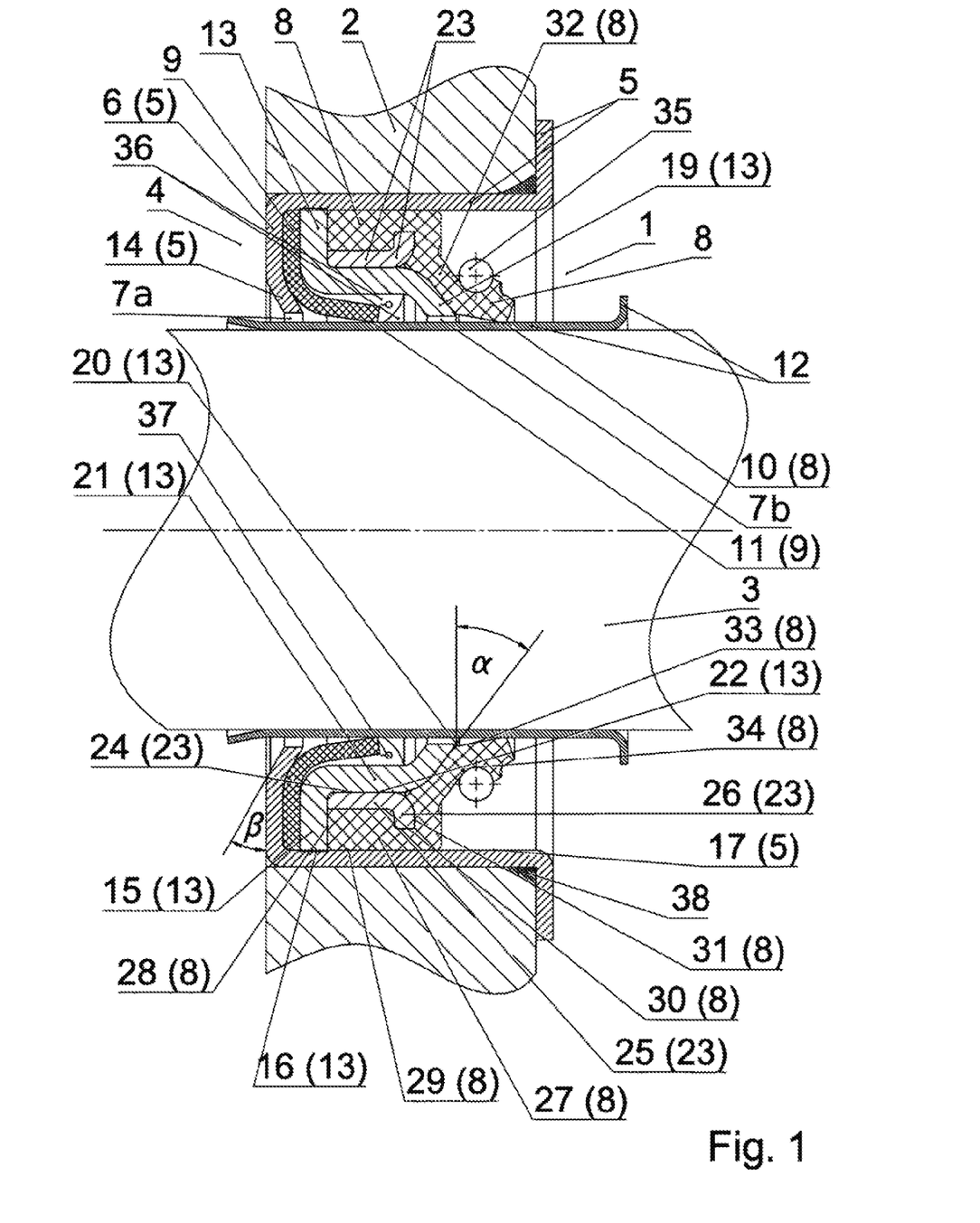
FIG. 1: shows the radial shaft seal according to the invention, disposed in a seal housing 5 with assembly flange, for a seal seat with a bore diameter of 20 mm, in the installed condition, i.e. after the installation in the working housing 2 of a coolant pump, in side view in section.

The invention will be explained in more detail in the following on the basis of an exemplary embodiment in conjunction with 12 figures.

wherein:

FIG. 1 shows the radial shaft seal according to the invention, disposed in a seal housing 5 with assembly flange, for a seal seat with a bore diameter of 20 mm, in the installed condition, in a coolant pump, in side view in section.

The radial shaft seal according to the invention for sealing, relative to the outside space 4, the atmosphere, of a rotating shaft 3 led out of a pressure chamber 1, filled with a fluid medium, of a working housing 2, which seal has, disposed in a bore of the working housing 2, a metallic seal housing 5 having a rear wall 6 and a shaft penetration bore 7 disposed in this rear wall 6, is characterized in that an elastomeric sealing member 8 having an elastomeric sealing lip 10 and a plastic sealing member 9 having PTFE and a plastic sealing lip 11 are disposed respectively in the seal housing 5 on the pressure-chamber side and on the outer-space side, in such a way that these sealing lips bear directly on the shaft 3 or, as illustrated in this exemplary embodiment, on a running sleeve 12 disposed on the shaft 3 to rotate with it, wherein the two sealing members, the elastomeric sealing member 8 and the plastic sealing member 9, are positioned exactly in their place relative to the seal housing 5 by means of at least one metallic bracing member 13 equipped with an annular shaft penetration bore 7*b*.

It is essential that a sealing-member contact flange 14 inclined frustoconically in the direction of the pressure chamber 1 at a contact taper angle β in the range of 25° to 38° is disposed on the rear wall 6 in the region of the shaft penetration bore 7*a*.

In the designs, described here in the exemplary embodiments, of the solution according to the invention, the contact taper angle β lies in the range of 25° to 28°. The sealing-member contact flange 14 inclined at the contact taper angle β imposes a specified deformation of the plastic sealing member 9, which in the present exemplary embodiment consists of polytetrafluoroethylene (PTFE), in the direction of the pressure chamber 1, so that it maintains its optimum sealing geometry even during pressurization on the pressure-chamber side, whereby the wear of the plastic sealing lip 11 of the plastic sealing member 9 is minimized and the so-called "trumpet effect" is prevented.

The sealing-member contact flange 14 inclined at the contact taper angle β ensures that the contact face of the plastic sealing lip 11 remains almost constant independently of the existing inner pressure, so that, similarly to the wear, the heat of friction at the sealing location and thus also the friction losses are minimized.

It is also characteristic that a bracing-member web 15 having a cylindrical bracing-member-web outer rim 16 is disposed on the bracing member 13, wherein the diameter of the bracing-member-web outer rim 16 has an oversize compared with the diameter of the inside wall 17 of the seal housing 5, so that the bracing member 13, which in the final assembly condition presses the plastic sealing member 9 against the rear wall 6, is joined in the seal housing 5 with interference fit, wherein the bracing member 13, for example by virtue of a weld seam/several weld seams 18 additionally disposed in the rim region between the bracing member 13 and the seal housing 5, is therefore connected in the firmly pressed-in condition (joined with press fit) to the seal housing 5 not only frictionally but additionally even by substance-to-substance bond.

In the exemplary embodiments described here, the weld seams 18 illustrated in the drawings are laser weld seams.

Thereby a high positional securing is assured for this bracing member 13, which is fixed firmly in the seal housing 5, i.e. pressed in/clamped, and in this clamped condition is subsequently even additionally (laser) welded. In the process, the press fit ensures that the plastic sealing member 9 is clamped securely in place against the rear wall 6, so that the twist resistance of the plastic sealing member 9 achieved thereby ensures high reliability of this seal over the entire service duration.

Due to the additional substance-to-substance bond by means of (laser) welding, this resistance is further increased by a multiple, and so the (laser) welded bracing member 13 is capable of absorbing very high tensile, compressive, torsional and bending stresses and strains.

It is also according to the invention, however, that a bracing-web pressing flange 19 inclined frustoconically in the direction of the pressure chamber 1 at a pressing taper angle α in the range of 34° to 39° is disposed on the bracing member 13 in the region of the shaft penetration bore 7b of the bracing member 13, which flange has, at its free end on the pressure-chamber side, a bracing-flange rim 20, which permits a secure and reliable, optimum bracing of the elastomeric sealing member 8 for assurance of a high sealing effect with minimum friction losses. In the present exemplary embodiment, the pressing taper angle α=36.8°.

It is further essential to the invention that a positioning cylinder 21 having a positioning cylinder outer jacket 22 is disposed on the bracing member 13 between the bracing-member web 15 and the bracing-web pressing flange 19, and that a cylindrical position-securing-cap inner jacket 24 of an elastomeric sealing-member positioning cap 23 is disposed by means of press fit on the positioning-cylinder outer jacket 22, which inner jacket consists of a cylinder cap 25, on which a sealing-member receiving web 26 is rigidly disposed on the pressure-chamber side, and that the elastomeric sealing member 8 has a sealing-member positioning cylinder 27, which is radially clamped with its inner jacket 30 on the cylinder cap 25 in such a way that it is simultaneously linked to the sealing-member receiving web 26 by means of an undercut 31 disposed on the inner jacket 30 of the elastomeric sealing member 8 and associated with the sealing-member receiving web 26, and that the elastomeric sealing member 8 disposed on the elastomeric sealing-member positioning cap 23 bears in the final assembly condition with its end face 28 on the bracing-member web 15 in such a way that the outer jacket 29 disposed on the sealing-member positioning cylinder 27 is simultaneously clamped elastically in the seal housing 5.

The high stresses and strains imposed on the bracing member 13 mounted in this seal housing 5 during assembly and also in continuous operation are reliably transmitted, by its substance-to-substance bond and frictional arrangement according to the invention, into the seal housing 5.

At the same time, the solution according to the invention permits the use of inexpensive stamped parts for the bracing member 13 and the elastomeric sealing-member positioning cap 23, whereby a positional securing of both sealing members, i.e. the elastomeric sealing member 8 and the plastic sealing member 9, on and in the seal housing 5, is assured that can be achieved simply and also very reliably and at the same time very inexpensively by fabrication and assembly technology.

It is further essential that the contact region 32 of the elastomeric sealing member 8 adjoining the sealing-member positioning cylinder 27 bears with large surface on the bracing-web pressing flange 19, wherein the elastomeric sealing member 8 transitions after the contact region 32 in the region of the bracing-flange rim 20 into a cantilevered bracing-arch web 33, on the end of which on the pressure-chamber side the elastomeric sealing lip 10 is then disposed on the elastomeric sealing member 8 and bears on the shaft 3 or on a running sleeve 12 disposed on the shaft 3 to rotate with it.

This running sleeve 12 consists of stainless steel and has a surface hardness greater than 1120 HV.

In the present exemplary embodiment, the surface hardness of the running sleeve 12 is 1450 HV.

The use of such running sleeves 12 with high surface hardness ensures that the shaft 3 can be manufactured substantially more inexpensively, since the running sleeves 12 can be fabricated separately and also pulled onto the shafts 3 only in the region of the radial shaft seal. Thereby a corrosion under the sealing lips is avoided, the wear in the region of the sealing lip is minimized, even if foreign particles "are trapped" under the sealing lip, i.e. a scoring on the running faces is greatly reduced, whereby the running faces remain almost free of wear, i.e. undamaged with respect to the sealing effect, for a long time during real service.

It is essential to the invention that an external groove 34 is disposed approximately centrally above the bracing-arch web 33 on the outer circumference of the elastomeric sealing member 8, in which groove a cord spring 35 is disposed that presses both the contact region 32 of the elastomeric sealing member 8 onto the bracing-web pressing flange 19 and simultaneously also the linear elastomeric sealing lip 10 against the running sleeve 12 disposed on the shaft 3 to rotate with it.

This arrangement, according to the invention, of a cord spring 35 approximately centrally above the bracing-arch web 33 on the outer circumference of the elastomeric sealing member 8 brings about an optimum force distribution of the spring prestressing force $F_{FV}$ on the one hand into the bracing force $F_S$, which acts on the contact region 32 of the elastomeric sealing member 8 and presses the contact region 32 of the elastomeric sealing member 8 onto the bracing-web pressing flange 19, and on the other hand into the lip-pressing force $F_L$, which acts in defined manner on the linear elastomeric sealing lip 10 and presses the elastomeric sealing lip 10 optimally against the running sleeve 12 disposed on the shaft 3 to rotate with it.

This arrangement ensures that an optimum vibration damping of the elastomeric sealing lip 10 can be assured with optimum sealing-lip prestressing and minimum friction losses over the entire running time of the radial shaft seal according to the invention, whereby the friction and the wear are minimized, the vacuum stability is ensured over the entire useful life of the radial shaft seal and leaks via/at the sealing locations between the elastomeric sealing lip 10 and the running sleeve 12 can be avoided.

A further feature of the invention consists in that a lubricating chamber 36, in which a lubricating medium 37 is disposed, in the present exemplary embodiment a PTFE grease, is disposed between the bracing member 13, the plastic sealing member 9 and the shaft 3 or the running sleeve 12 respectively.

Thereby it is ensured that sticking of the sealing lip during transportation to the end customer is prevented and the sealing lip is not torn loose during the first startup, while simultaneously the running-in behavior of the sealing lips is improved, the sealing lip is lubricated even during dry tests, the friction temperature under unfavorable service conditions is reduced and even the stick-slip tendency (noise and squeaking due to vibration tendency) under unfavorable service conditions (such as poorly lubricating coolant, high coolant temperatures and low speeds of revolution, e.g. idling speed of revolution, in combination) is prevented.

Figure 2:
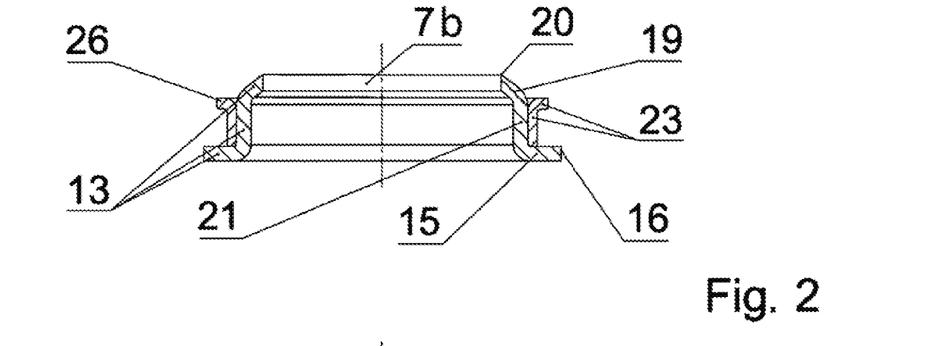
FIG. 2: shows the metal components of the solution according to the invention inserted into the seal housing 5, i.e. the bracing member 13 and the elastomeric sealing-member positioning cap 23, without sealing member and without seal housing 5, but for illustration of the later assembly joined together with one another by press fit, in side view in section.

FIG. 2 shows the metal components of the solution according to the invention inserted into the seal housing 5, i.e. the bracing member 13 and the elastomeric sealing-member positioning cap 23, without sealing member and without seal housing 5, but for illustration of the later assembly already joined together with one another by press fit, in side view in section.

The solution according to the invention permits, as illustrated in FIG. 2, the use of the stamped parts illustrated in FIG. 2 for the bracing element 13 and the elastomeric sealing-member positioning cap 23. The use of stamped parts for these components permits an inexpensive fabrication and a simple assembly.

At the same time, the solution according to the invention ensures a very reliable and simultaneously inexpensive positional securing of both sealing members, i.e. the elastomeric sealing member 8 and the plastic sealing member 9, on and in the seal housing 5 of the radial shaft seal according to the invention.

Figure 3:
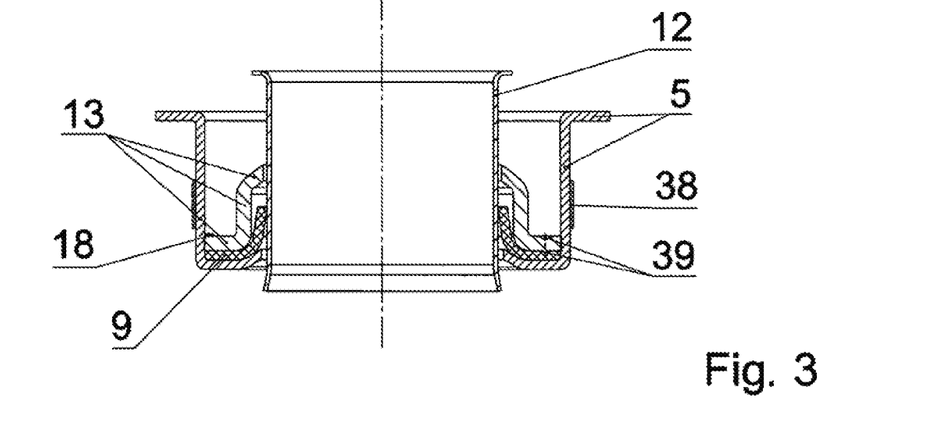
FIG. 3: shows the radial shaft seal according to the invention during the assembly, with the plastic sealing member 9 with inserted running sleeve 12 positioned securely in place by the bracing member 13 in a seal housing 5 with assembly flange, for a seal seat with a bore diameter of 20 mm, prior to final assembly, in side view in section.

In FIG. 3, the radial shaft seal according to the invention is illustrated during the assembly, with the plastic sealing member 9 with inserted running sleeve 12 positioned securely in place by the bracing member 13 in a seal housing 5 with assembly flange, for a seal seat with a bore diameter of 20 mm, prior to final assembly, in side view in section.

A bracing-member web 15 having a cylindrical bracing-member-web outer rim 16 is disposed on the bracing member 13. The diameter of the bracing-member-web outer rim 16 has an oversize compared with the diameter of the inner wall 17 of the seal housing 5, so that the bracing member 13, which presses the plastic sealing member 9 against the rear wall 6, is joined with press fit in the seal housing 5.

For positional securing of the plastic sealing member 9 on the bracing member 13, positioning notches 39 are disposed on the circumference of the bracing-member web 15 in such a way that their driver tapers are anchored in the plastic sealing member 9.

Sealing lacquer 38 is disposed circumferentially on the outer circumference of the seal housing 5.

This sealing lacquer 38 ensures that irregularities in the housing bore are evened out and the static leak tightness between the working housing 2 and the seal housing 5 is assured over the entire running time of the radial shaft seal.

Figure 4:
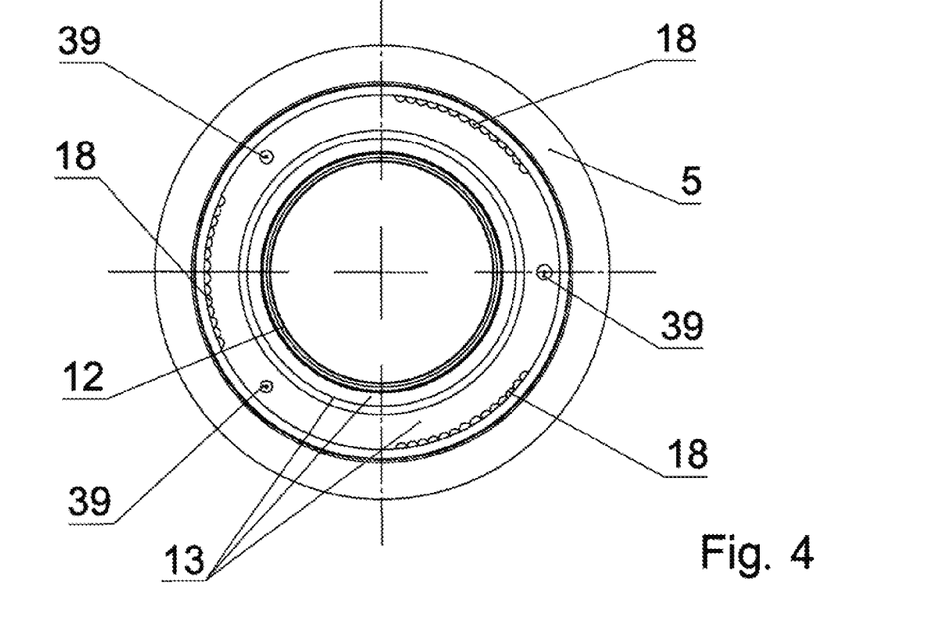
FIG. 4: shows the overhead view of the assembled condition, illustrated in FIG. 3, of the radial shaft seal according to the invention.

FIG. 4 shows the overhead view of the assembled condition, illustrated in FIG. 3, of the radial shaft seal according to the invention.

This diagram shows that the bracing member 13 anchored firmly by means of press fit in the seal housing 5 is also connected by substance-to-substance bond to the seal housing 5 by means of several laser weld seams 18 distributed uniformly over the circumference and disposed in the rim region between the bracing member 13 and the seal housing 5.

According to the invention, this bracing member 13, which is firmly clamped in the seal housing 5 by being pressed in and in this way is already fixed in position, is subsequently also laser-welded in this clamped condition to the seal housing 5, as illustrated in FIGS. 3 and 4. Due to this additional substance-to-substance bond by means of laser welding, the positional securing is further increased by a multiple, and so the laser-welded bracing member 13 is capable of absorbing very high stresses and strains.

Figure 5:
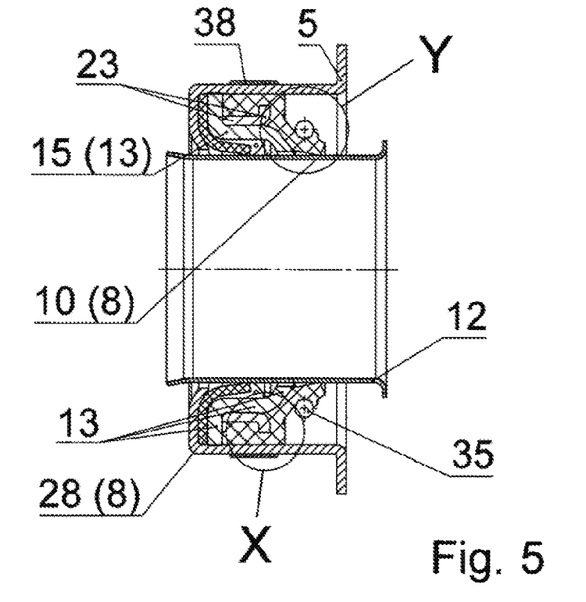
FIG. 5: shows the radial shaft seal illustrated in FIG. 1, disposed in a seal housing 5 with assembly flange, for a seal seat with a bore diameter of 20 mm, in the final assembly condition/outgoing delivery condition, i.e. prior to the installation in a working housing 2 of a coolant pump, in side view in section.

In FIG. 5, the radial shaft seal (disposed in a seal housing 5 with assembly flange, for a seal seat with a bore diameter of 20 mm) illustrated in FIG. 1 is illustrated in the final assembly condition/outgoing delivery condition, i.e. prior to the installation in the working housing 2 of a coolant pump, in side view in section. Sealing lacquer 38 is disposed circumferentially on the outer circumference of the seal housing, in order to prevent static leaks (whether air and/or coolant) between the working housing 2 and the seal housing 5 after the installation in the working housing 2.

Figure 6:
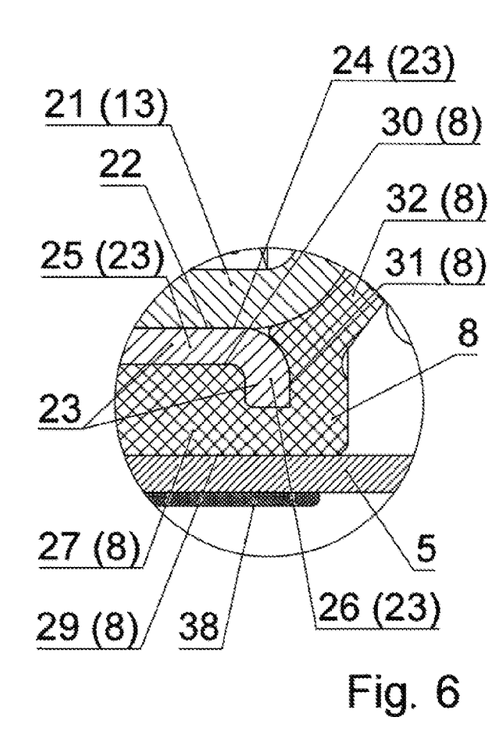
FIG. 6: shows detail X of the radial shaft seal according to the invention illustrated in FIG. 5.

In FIG. 6, the detail X is illustrated of the radial shaft seal according to the invention illustrated in FIG. 5.

This detail shows the positioning cylinder 21 disposed on the bracing member 13 together with the positioning-cylinder outer jacket 22, on which the cylindrical position-securing-cap inner jacket 24 of the elastomeric sealing member positioning cap 23 is disposed, by means of press fit according to the invention, which positioning cap consists of the cylinder cap 25 and a sealing-member receiving web 26 disposed rigidly on this on the pressure-chamber side. The inner jacket 30 of the sealing-member positioning cylinder 27 of the elastomeric sealing member 8 is radially clamped externally onto the cylinder cap 25.

This is simultaneously linked into the sealing-member receiving web 26 by means of an undercut 31 disposed on the inner jacket 30 of the elastomeric sealing member 8 and associated with the sealing-member receiving web 26.

Thereby it is ensured that the elastomeric sealing member 8 is also reliably secured axially with the elastomeric sealing lip 10 over the entire useful life of the radial shaft seal according to the invention.

The elastomeric sealing member 8 disposed on the elastomeric sealing-member positioning cap 23 is illustrated in FIGS. 1, 5, 8, 9 and 10 and in the final assembly condition bears with its end face 28 leak-tightly on the bracing-member web 15.

Figure 7:
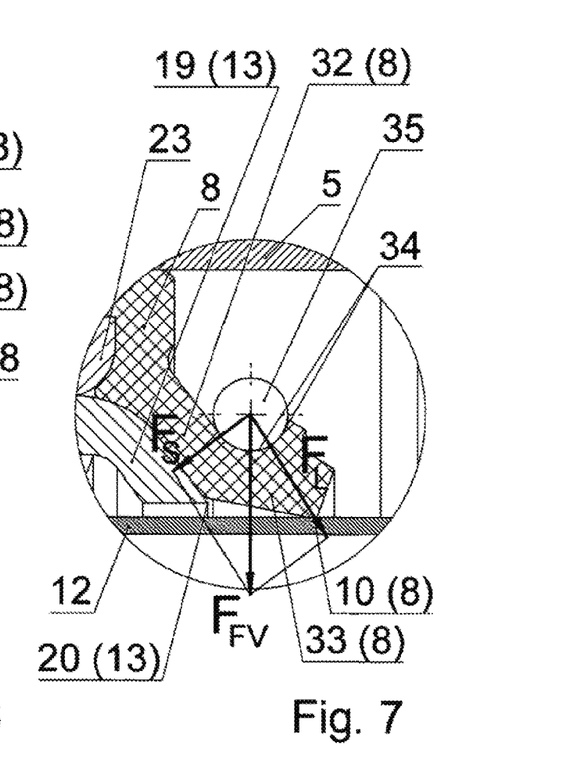
FIG. 7: shows detail Y of the radial shaft seal according to the invention illustrated in FIG. 5.

FIG. 7 shows the detail Y of the radial shaft seal according to the invention illustrated in FIG. 5.

This detail discloses that, according to the invention, an external groove 34 is disposed approximately centrally above the bracing-arch web 33 on the outer circumference of the elastomeric sealing member 8, in which groove a cord spring 35 is disposed, the spring prestressing force $F_{FV}$ of which, acting on the outer circumference of the elastomeric sealing member 8, on the one hand presses not only the contact region 32 of the elastomeric sealing member 8 with a bracing force $F_S$ onto the bracing-web pressing flange 19 but simultaneously also the linear elastomeric sealing lip 10 with a lip-pressing force $F_L$ against the running sleeve 12 disposed on the shaft 3 to rotate with it.

This arrangement, according to the invention, of the cord spring 35 on the outer circumference of the elastomeric sealing member 8, centrally above an arch-shaped bracing-arch web 33, which according to the invention is cantilevered, ensures that an optimum vibration damping of the elastomeric sealing lip 10 can be achieved over the entire running time of the radial shaft seal according to the invention, and even that the stick-slip tendency (vibration tendency) under unfavorable service conditions (such as poorly lubricating coolant, high coolant temperatures and low speeds of revolution, such as the idling speed of revolution, for example, both individually and in combination) can be prevented.

Simultaneously, the radial shaft seal according to the invention ensures an optimum sealing-lip prestressing, which also counteracts the compression set of the elastomer, and which minimizes both the friction and also the wear, wherein an automatic optimum readjustment of the contact zone by the cord spring 35 takes place even if any wear occurs despite this, so that the vacuum stability is also additionally ensured over the entire useful life of the radial shaft seal and any leaks via/at the sealing locations between the elastomeric sealing lip 10 and the running sleeve 12 are avoided.

Figure 8:
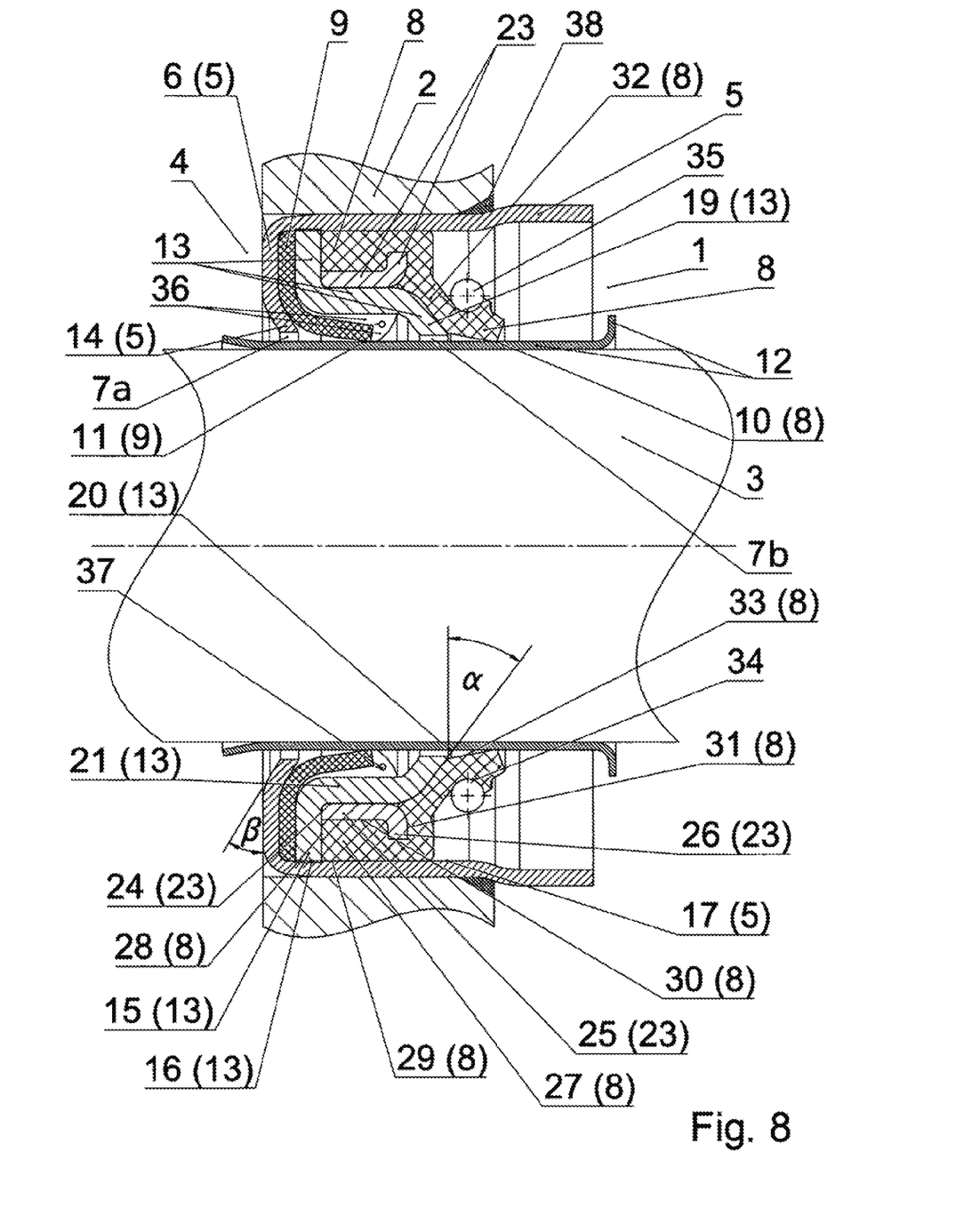
FIG. 8: shows the radial shaft seal according to the invention, disposed in a seal housing 5 without assembly flange, for a seal seat with a bore diameter of 20 mm, in the final assembly condition/outgoing delivery condition.

FIG. 8 shows the radial shaft seal according to the invention, disposed in a different seal housing 5 without assembly flange, for a seal seat with a bore diameter of 20 mm, in the final assembly condition/outgoing delivery condition.

This design of the seal housing 5 is used in water pumps in which the overall installation space of the seal is limited to less than 21 mm. In this design, the seal housing 5 was expanded axially, in order in this way to press the seal housing 5 leak-tightly into the working housing 2.

All features essential to the invention and already explained in connection with FIG. 1 are also essential components of this embodiment, and so the statements made concerning FIG. 1 also apply to FIG. 8.

Figure 9:
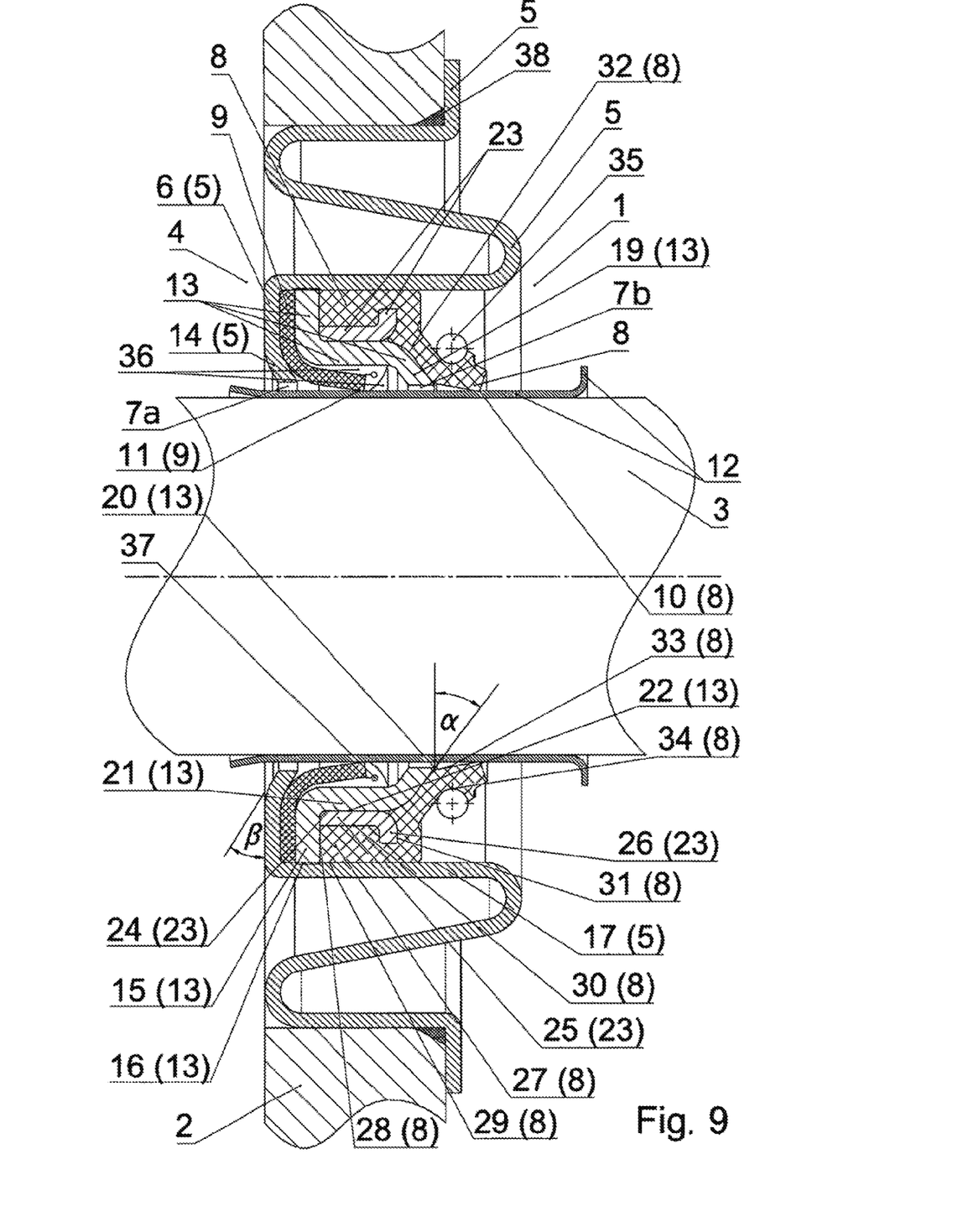
FIG. 9: shows the radial shaft seal according to the invention, disposed in a seal housing 5 with assembly flange, for a seal seat with a bore diameter of 30 mm, for housings with small material thickness, i.e. for low overall installation depth, in the final assembly condition/outgoing delivery condition.

FIG. 9 shows the radial shaft seal according to the invention, disposed in a seal housing 5 with assembly flange, for a seal seat with a bore diameter of 30 mm, for housings with small material thickness, i.e. for low overall installation depth, in the final assembly condition/outgoing delivery condition.

This design of the seal housing 5 is used in order to replace traditional rotating mechanical seals having a standard bore diameter in the working housing 2 of 30 mm and an overall installation depth in the direction of the water-pump bearing of at most 6 mm by a radial shaft seal of the design according to the invention.

All features essential to the invention and already explained in connection with FIG. 1 are also essential components of this embodiment, and so the statements made concerning FIG. 1 also apply to FIG. 9.

Figure 10:
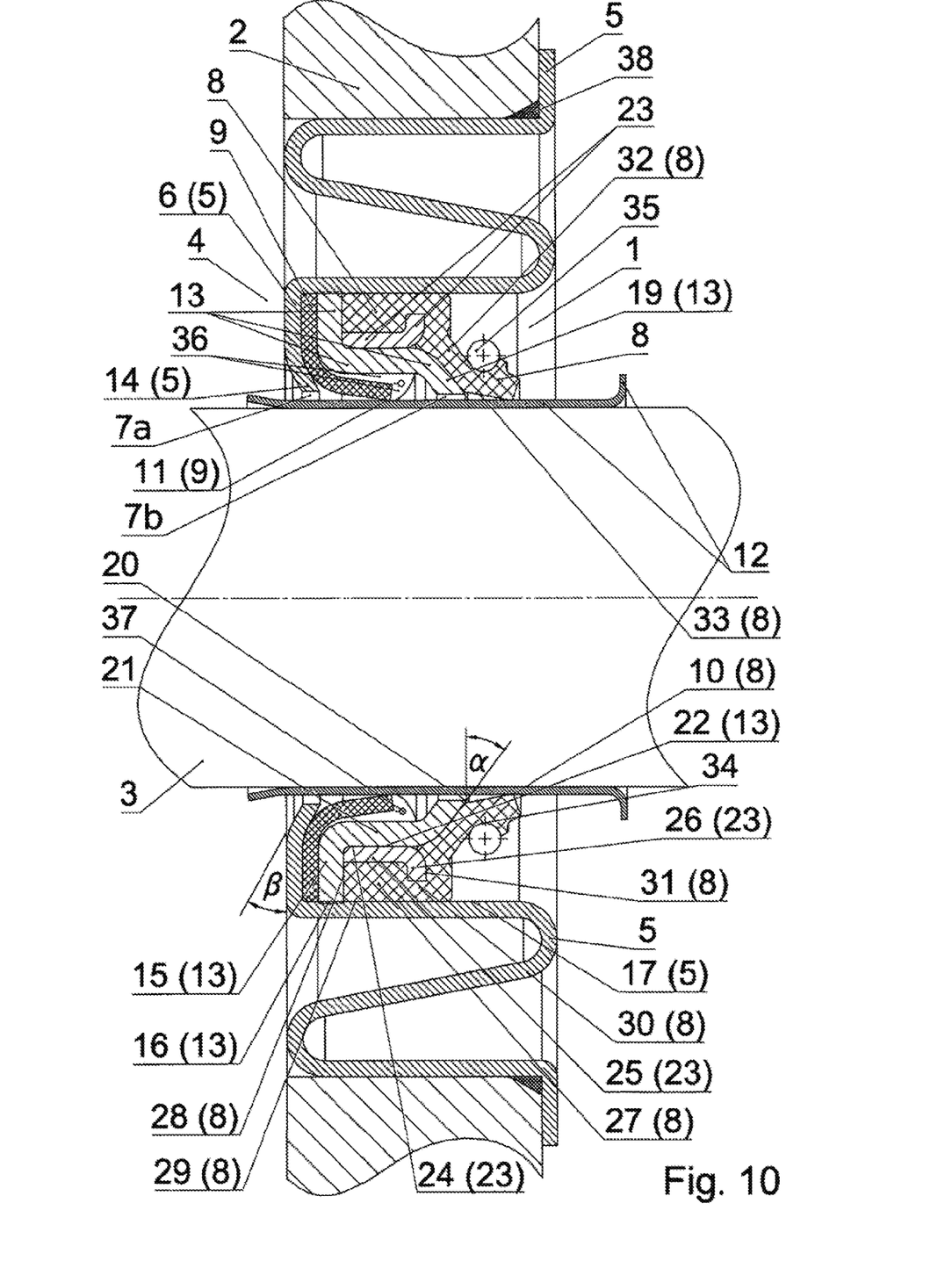
FIG. 10: shows the radial shaft seal according to the invention, disposed in a seal housing 5 with assembly flange, for a seal seat with a bore diameter of 30 mm, in the final assembly condition/outgoing delivery condition.

FIG. 10 shows the radial shaft seal according to the invention, disposed in a seal housing 5 with assembly flange, for a seal seat with a bore diameter of 30 mm, in the final assembly condition/outgoing delivery condition.

This design of the seal housing 5 is used in order to replace traditional rotating mechanical seals having a standard bore diameter in the working housing 2 of 30 mm and an overall installation depth in the direction of the water-pump bearing of 8 mm and more by a radial shaft seal of the design according to the invention.

All features essential to the invention and already explained in connection with FIG. 1 are also essential components of this embodiment, and so the statements made concerning FIG. 1 also apply to FIG. 10.

Figure 11:
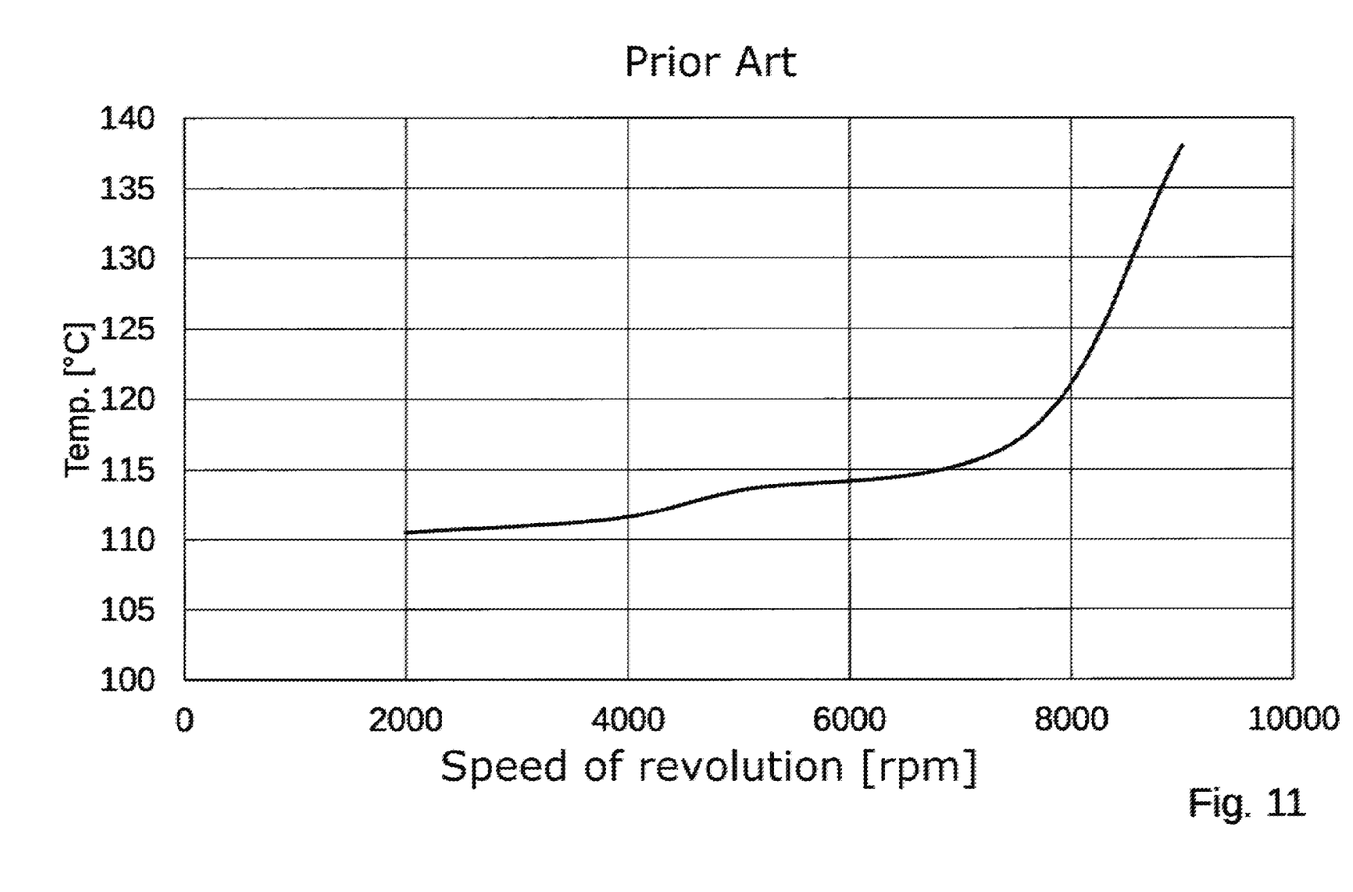
FIG. 11: shows the curve of temperature versus speed of revolution for the radial shaft seal according to EP 2817539 B1.
Figure 12:
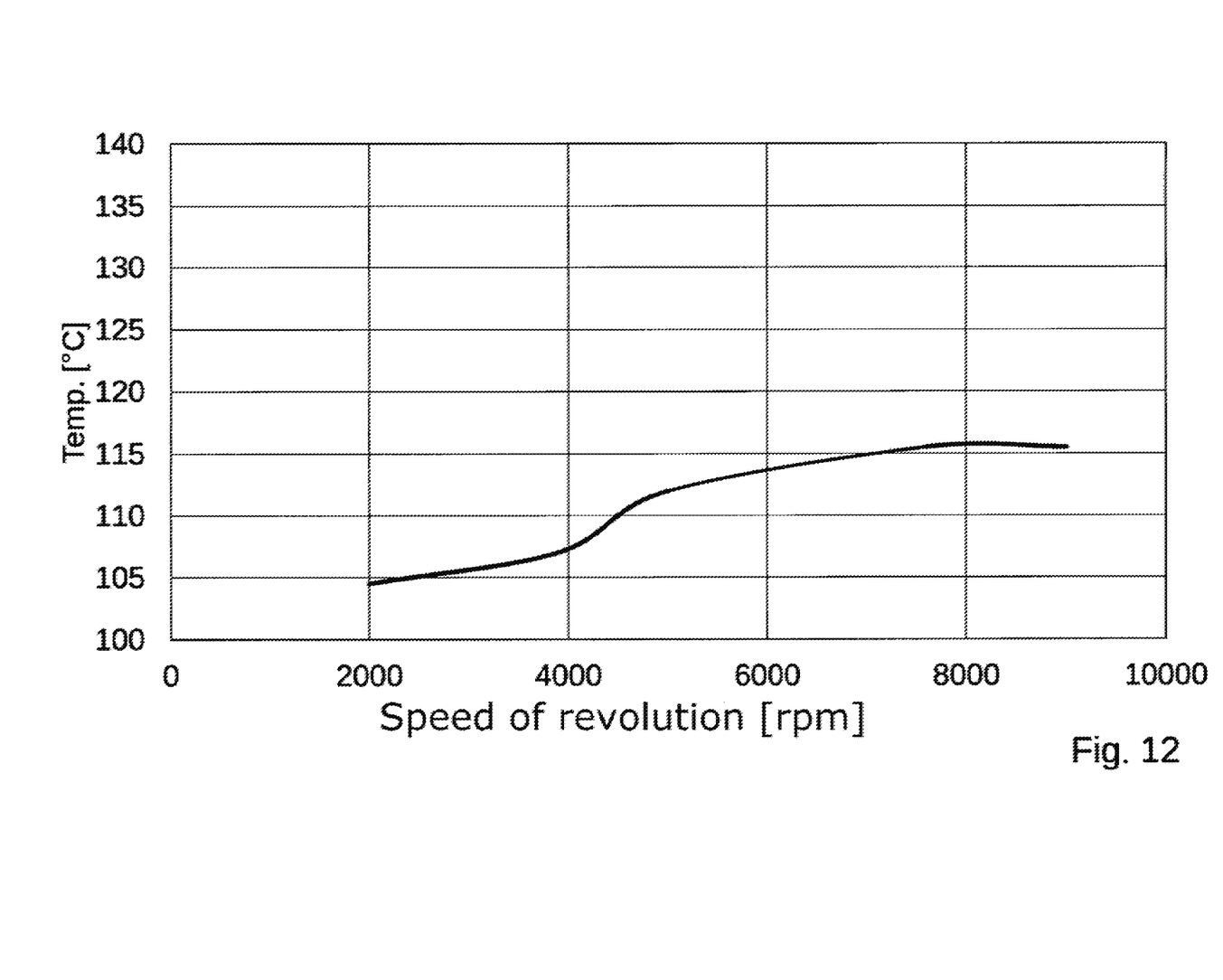
FIG. 12: shows the curve of temperature versus speed of revolution for the radial shaft seal according to the invention.

In FIGS. 11 and 12, the measured results of an experimental setup are presented graphically, wherein the curve of temperature versus speed of revolution was determined under the same experimental conditions with the radial shaft seal according to EP 2817539 B1 in FIG. 11 and with the radial shaft seal according to the invention in FIG. 12.

The same coolant was used both times.

This temperature measurement was carried out (from behind) directly at the elastomeric sealing lip at a pressure of 2.5 bar in the pressure chamber and in the coolant chamber, and at a coolant temperature of 107° C., always after respectively 3 minutes continuous running, with the indicated speed of revolution.

FIG. 11, which shows the curve of temperature versus speed of revolution during use of the radial shaft seal according to EP 2817539 B1, shows that a significant temperature rise at the seal already develops at the elastomeric sealing member 8 disposed on the water side starting from speeds of revolution of over approximately 7,000 rpm.

It is assumed that this is to be attributed to the situation that, in the elastomeric sealing lip used in EP 2817539 B1, the liquid film between the shaft 3 or respectively the sleeve 12 and the elastomeric sealing lip 10 tears away at higher speeds of revolution, i.e. at speeds of revolution in the region of 7,000 rpm, and this then leads with increasing speed of revolution to a temperature rise at the elastomeric sealing lip 10 that increases significantly with the increase of speed of revolution.

FIG. 12 shows the curve of temperature versus speed of revolution determined with the same experimental setup, but now during use of the radial shaft seal according to the invention.

The comparison of the two diagrams proves very clearly that, with the novel design of the elastomeric sealing lip according to the invention, illustrated in detail in FIG. 7, the loss powers, i.e. the friction losses, are very significantly reduced compared with the existing prior art, especially at higher speeds of revolution, and thus it was possible at the same time to greatly increase the reliability and also the useful life of the radial shaft seal according to the invention.

By means of the solution according to the invention, therefore, it has become possible to develop, for sealing, relative to the atmosphere, of a rotating shaft led out of a chamber filled with a fluid medium, a radial shaft seal, which eliminates the aforesaid disadvantages of the prior art even in cooling pumps, with use of low-viscosity, water-based coolants containing lightly lubricating additives, and significantly reduces the friction losses and also the leakage losses compared with the existing prior art, which significantly increases the reliability and also the useful life and in addition reliably prevents leaks while stationary, so that an "air-free" vacuum filling of cooling pumps is possible even after prolonged service time, and simultaneously the novel radial shaft seal is easy to manufacture and assemble by fabrication technology, and so the fabrication and assembly costs in final fabrication are also reduced significantly.

LIST OF REFERENCE SYMBOLS

1 Pressure chamber
2 Working housing
3 Shaft
4 Outside space
5 Seal housing
6 Rear wall
7a Shaft penetration bore in the rear wall 6
7b Shaft penetration bore in the bracing member 13
8 Elastomeric sealing member
9 Plastic sealing member
10 Elastomeric sealing lip
11 Plastic sealing lip
12 Running sleeve
13 Bracing member
14 Sealing-member contact flange
15 Bracing-member web
16 Bracing-member-web outer rim
17 Inner wall
18 Weld seam
19 Bracing-web pressing flange
20 Bracing-flange rim
21 Positioning cylinder
22 Positioning-cylinder outer jacket
23 Elastomeric sealing-member positioning cap
24 Position-securing-cap inner jacket
25 Cylinder cap
26 Sealing-member receiving web
27 Sealing-member positioning cylinder
28 End face
29 Outer jacket
30 Inner jacket
31 Undercut
32 Contact region
33 Bracing-arch web
34 External groove
35 Cord spring
36 Lubricating chamber
37 Lubricating medium
38 Sealing lacquer
39 Positioning notch
$F_{FV}$ Spring prestressing force
$F_S$ Bracing force
$F_L$ Lip pressing force
α Pressing taper angle
β Contact taper angle
n Speed of revolution
Temp. Temperature

The invention claimed is:

1. A radial shaft seal for sealing, relative to an outside space, the atmosphere, of a rotating shaft led out of a pressure chamber, filled with a fluid medium, of a working housing, which seal has, disposed in a bore of the working housing, a metallic seal housing with a rear wall and a shaft penetration bore disposed in this rear wall, wherein an elastomeric sealing member having an elastomeric sealing lip and a plastic sealing member having PTFE and a plastic sealing lip are disposed in the seal housing, respectively on the pressure-chamber side and on the outer-space side, in such a way that these sealing lips bear directly on the shaft or on a running sleeve disposed on the shaft to rotate with it, wherein the two sealing members, the elastomeric sealing member and the plastic sealing member, are positioned exactly in their place relative to the seal housing by means of at least one metallic bracing member equipped with an annular shaft penetration bore, wherein a sealing-member contact flange inclined frustoconically in the direction of the pressure chamber at a contact taper angle β in the range of 25° to 38° is disposed on the rear wall in the region of the shaft penetration bore, opposite a plane of a radial section through the shaft, and a bracing-member web having a cylindrical bracing-member-web outer rim is disposed on the bracing member, wherein the bracing-member-web outer rim has an outer diameter which has an oversize compared with an inner diameter of an associated inner wall of the seal housing, so that the bracing member, which in the final assembly condition presses the plastic sealing member against the rear wall, is joined with press fit in the seal housing, and a bracing-web pressing flange inclined frustoconically in the direction of the pressure chamber, opposite the plane of the radial section through the shaft at a pressing taper angle α in the range of 34° to 39° is disposed on the bracing member in the region of the shaft penetration bore of the bracing member, which flange has, at its free end on the pressure-chamber side, a bracing-flange rim, and a positioning cylinder having a positioning cylinder outer jacket is disposed on the bracing member between the bracing-member web and the bracing-web pressing flange, a cylindrical position-securing-cap inner jacket of an elastomeric sealing-member positioning cap is disposed by means of press fit on the positioning-cylinder outer jacket, which positioning cap comprises a cylinder cap, on which a sealing-member receiving web is rigidly disposed on the pressure-chamber side, and the elastomeric sealing member has a sealing-member positioning cylinder, which is radially clamped with its inner jacket on the cylinder cap in such a way that it is simultaneously linked to the sealing-member receiving web by means of an undercut disposed on the inner jacket of the elastomeric sealing member and associated with the sealing-member receiving web, and the elastomeric sealing member disposed on the elastomeric sealing-member positioning cap bears in the final assembly condition with its end face on the bracing-member web in such a way that the outer jacket disposed on the sealing-member positioning cylinder is simultaneously clamped elastically in the seal housing, and a contact region of the elastomeric sealing member adjoining the sealing-member positioning cylinder bears with large surface on the bracing-web pressing flange, wherein the elastomeric sealing member transitions after the contact region in the region of the bracing-flange rim into a cantilevered bracing-arch web, on the end of which on the pressure-chamber side the elastomeric sealing lip is then disposed on the elastomeric sealing member and bears on the shaft or on a running sleeve disposed on the shaft to rotate with it, and an external groove is disposed centrally above the bracing-arch web of the outer circumference of the elastomeric sealing member, in which groove a cord spring is disposed that presses both the contact region of the elastomeric sealing member onto the bracing-web pressing flange and simultaneously also the elastomeric sealing lip against the shaft or respectively the running sleeve disposed on the shaft to rotate with it, and a lubricating chamber between the bracing member, the plastic sealing member and the shaft or respectively the running sleeve, in which chamber a lubricating medium is disposed.

2. The radial shaft seal according to claim 1, wherein the bracing-member web of the bracing member in this joined condition, is therefore connected to the seal housing not only frictionally but additionally also by substance-to-substance bond by means of a weld seam/several weld seams disposed in the rim region between the bracing member and the seal housing.

3. The radial shaft seal according to claim 2, wherein the weld seam(s) disposed between the bracing member and the seal housing is/are made as laser weld seam(s).

4. The radial shaft seal according to claim 1, wherein for positional securing of the plastic sealing member on the bracing member, driver tapers are disposed on the circumference of the bracing-member web, on the same side as the plastic sealing member.

5. The radial shaft seal according to claim 1, wherein a PTFE grease is disposed as lubricating medium in the lubricating chamber.

6. The radial shaft seal according to claim 1, with a running sleeve disposed on the shaft to rotate with it, wherein the running sleeve comprises stainless steel and has a surface hardness greater than 1200 HV.

7. The radial shaft seal according to claim 1, wherein lacquer for sealing from the working housing is disposed circumferentially on the outer jacket of the seal housing.

8. The radial shaft seal according to claim 4, wherein the driver tapers are formed by positioning notches.

* * * * *